United States Patent
Zhao et al.

(10) Patent No.: US 10,202,189 B2
(45) Date of Patent: Feb. 12, 2019

(54) UNMANNED AERIAL VEHICLE, WEARABLE APPARATUS INCLUDING UNMANNED AERIAL VEHICLE, WRISTWATCH INCLUDING WEARABLE APPARATUS, METHOD OF OPERATING UNMANNED AERIAL VEHICLE, AND APPARATUS FOR OPERATING UNMANNED AERIAL VEHICLE

(71) Applicant: BOE TECHNOLOGY GROUP CO., LTD., Beijing (CN)

(72) Inventors: Kai Zhao, Beijing (CN); Yu Gu, Beijing (CN); Hongli Ding, Beijing (CN); Yifei Zhang, Beijing (CN); Ying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/571,606

(22) PCT Filed: May 24, 2017

(86) PCT No.: PCT/CN2017/085699
§ 371 (c)(1),
(2) Date: Nov. 3, 2017

(87) PCT Pub. No.: WO2018/036231
PCT Pub. Date: Mar. 1, 2018

(65) Prior Publication Data
US 2018/0312253 A1 Nov. 1, 2018

(30) Foreign Application Priority Data
Aug. 22, 2016 (CN) .......................... 2016 1 0702985

(51) Int. Cl.
*B64C 39/02* (2006.01)
*G05D 1/00* (2006.01)
(Continued)

(52) U.S. Cl.
CPC ............ *B64C 39/024* (2013.01); *B64C 37/00* (2013.01); *B64C 39/028* (2013.01); *G04B 47/00* (2013.01);
(Continued)

(58) Field of Classification Search
USPC ............................................................ 701/2
See application file for complete search history.

(56) References Cited

U.S. PATENT DOCUMENTS

2015/0259066 A1* 9/2015 Johannesson ........... B64C 27/08
244/17.27
2016/0101856 A1 4/2016 Kohstall
(Continued)

FOREIGN PATENT DOCUMENTS

CN 204056294 U 12/2014
CN 204368421 U 6/2015
(Continued)

OTHER PUBLICATIONS

International Search Report & Written Opinion dated Aug. 24, 2017, regarding PCT/CN2017/085699.

*Primary Examiner* — Tyler D Paige
(74) *Attorney, Agent, or Firm* — Intellectual Valley Law, P.C.

(57) ABSTRACT

The present application discloses an unmanned aerial vehicle. The unmanned aerial vehicle includes a support having a plurality of receiving slots; a plurality of arms attached to the support; and a plurality of propellers respectively attached to the plurality of arms. Each of the plurality of receiving slots is configured to receive one of the plurality (Continued)

of arms and one of the plurality of propellers attached to the one of the plurality of arms.

20 Claims, 6 Drawing Sheets

(51) Int. Cl.
   *G04B 47/00*  (2006.01)
   *G05D 1/10*   (2006.01)
   *B64C 37/00*  (2006.01)

(52) U.S. Cl.
   CPC .......... *G05D 1/0016* (2013.01); *G05D 1/101* (2013.01); *B64C 2201/024* (2013.01); *B64C 2201/108* (2013.01); *B64C 2201/127* (2013.01); *B64C 2201/146* (2013.01); *B64C 2201/20* (2013.01)

(56) References Cited

U.S. PATENT DOCUMENTS

| | | | |
|---|---|---|---|
| 2016/0139602 A1 | 5/2016 | Kohstall | |
| 2016/0159471 A1* | 6/2016 | Chan | B64C 39/024 244/39 |
| 2016/0159472 A1* | 6/2016 | Chan | B64C 27/08 244/39 |
| 2016/0179096 A1* | 6/2016 | Bradlow | B64C 19/00 701/8 |
| 2016/0185454 A1* | 6/2016 | Hutson | B64C 39/024 244/17.23 |
| 2016/0304217 A1* | 10/2016 | Fisher | B60L 11/1809 |
| 2017/0144753 A1* | 5/2017 | Yu | B64C 39/024 |
| 2017/0313401 A1* | 11/2017 | Tang | B64C 1/30 |
| 2018/0075834 A1* | 3/2018 | Fong | H04R 3/04 |
| 2018/0105254 A1* | 4/2018 | Tian | B64C 1/30 |
| 2018/0118322 A1* | 5/2018 | Harris | B64C 1/063 |
| 2018/0155021 A1* | 6/2018 | Patterson | B64C 37/02 |
| 2018/0208291 A1* | 7/2018 | Tian | B64C 1/063 |

FOREIGN PATENT DOCUMENTS

| | | |
|---|---|---|
| CN | 105836148 A | 8/2016 |
| CN | 205891231 U | 1/2017 |
| DE | 202006013909 U1 | 3/2007 |

* cited by examiner

UNMANNED AERIAL VEHICLE, WEARABLE APPARATUS INCLUDING UNMANNED AERIAL VEHICLE, WRISTWATCH INCLUDING WEARABLE APPARATUS, METHOD OF OPERATING UNMANNED AERIAL VEHICLE, AND APPARATUS FOR OPERATING UNMANNED AERIAL VEHICLE

CROSS-REFERENCE TO RELATED APPLICATION

This application is a national stage application under 35 U.S.C. § 371 of International Application No. PCT/CN2017/085699, filed May 24, 2017, which claims priority to Chinese Patent Application No. 201610702985.1, filed Aug. 22, 2016, the contents of which are incorporated by reference in the entirety.

TECHNICAL FIELD

The present invention relates aerial vehicles, more particularly, to an unmanned aerial vehicle, a wearable apparatus including an unmanned aerial vehicle, a wristwatch including a wearable apparatus, a method of operating an unmanned aerial vehicle, and an apparatus for operating an unmanned aerial vehicle.

BACKGROUND

An unmanned aerial vehicle (UAV), commonly known as a drone, is an aircraft without a human pilot aboard. The UAV has been used in various fields such as aerial photography, surveillance, scientific research, geological survey, and remote sensing. The UAV typically includes a number of controllers for controlling the flight status of the UAV.

SUMMARY

In one aspect, the present invention provides an unmanned aerial vehicle (UAV), comprising a support having a plurality of receiving slots; a plurality of arms attached to the support; and a plurality of propellers respectively attached to the plurality of arms; wherein each of the plurality of receiving slots is configured to receive one of the plurality of arms and one of the plurality of propellers attached to the one of the plurality of arms.

Optionally, the UAV further comprises a plurality of first driving motors configured to respectively drive the plurality of propellers.

Optionally, the UAV further comprises a plurality of second driving motors configured to respectively drive the plurality of arms; wherein each of the plurality of arms is articulated to the support.

Optionally, the plurality of arms are a plurality of retractable arms.

Optionally, a total number of the plurality of arms is in a range of 3 to 6; and the plurality of arms are symmetrically distributed on the support.

Optionally, the UAV further comprises a first controller operatively coupled to at least one of the plurality of propellers and configured to be programmed with flight instructions to direct movements of the UAV based on the flight instructions.

Optionally, the UAV further comprises a first sensor configured to detect a flight trajectory of the UAV.

In another aspect, the present invention provides a wearable apparatus, comprising a UAV described herein; and a main body comprising a base portion; wherein the UAV is detachably attached to the base portion.

Optionally, the UAV is magnetically attached to the base portion.

Optionally, the wearable apparatus further comprises a cap portion configured to be cooperatively engaged with the base portion; wherein the cap portion is attached to the UAV.

Optionally, the UAV further comprises a first controller operatively coupled to at least one of the plurality of propellers and configured to be programmed with flight instructions to direct movements of the UAV; the main body further comprises a second controller, and a second sensor in communication with the second controller and configured to detect a gesture of a user wearing the wearable apparatus; the second controller is configured to receive user gesture information from the second sensor and provide the flight instructions to the first controller based on the user gesture information, and the first controller is configured to receive the flight instructions from the second controller to direct movements of the UAV based on the flight instructions.

Optionally, the user gesture information comprises an initial status information of the user and a motion information of the user.

Optionally, the initial status information comprises an initial status information of a human body part wearing the wearable apparatus; and the motion information comprises a motion information of the human body part wearing the wearable apparatus.

Optionally, the motion information comprises information regarding a projected direction of motion of the human body part wearing the wearable apparatus having the unmanned aerial vehicle; the second sensor is configured to determine a displacement of the human body part wearing the wearable apparatus having the unmanned aerial vehicle along a direction of motion of the human body part; and the second controller is configured to use the direction of motion of the human body part as the projected direction of motion, based on a determination that the displacement along the direction of motion of the human body part is equal to or greater than a threshold displacement value.

Optionally, the UAV further comprises a first sensor in communication with the first controller and configured to detect a flight trajectory of the UAV; and the first controller is configured to receive flight trajectory information of the UAV from the first sensor, and modify the flight trajectory of the UAV based on the flight instructions and the flight trajectory information of the UAV received from the first sensor.

Optionally, the UAV further comprises a plurality of first driving motors configured to respectively drive the plurality of propellers and a plurality of second driving motors configured to respectively drive the plurality of arms; and the first controller is configured to control the plurality of first driving motors and the plurality of second driving motors thereby controlling movements of the plurality of propellers and the plurality of arms.

In another aspect, the present invention provides a wristwatch comprising the wearable apparatus described herein; a watch belt attached to the main body, and a display screen, wherein the UAV further comprises a cap portion configured to be engaged with the base portion; and the display screen is on the cap portion.

Optionally, the wristwatch further comprises a camera attached to the UAV.

In another aspect, the present invention provides a method of operating an unmanned aerial vehicle (UAV), comprising receiving user gesture information of a gesture of a human body part wearing a wearable apparatus detected by a second sensor; determining flight instructions based on the user gesture information of the gesture of the human body part wearing the wearable apparatus; and sending flight instructions to a first controller to direction movements of the UAV based on the flight instructions.

In another aspect, the present invention provides an apparatus for operating an unmanned aerial vehicle (UAV), comprising a receiver configured to receive from a second controller user gesture information of a gesture of a human body part wearing a wearable apparatus; a determinator configured to determine flight instructions based on the user gesture information of the gesture of the human body part wearing the wearable apparatus; and a transmitter configured to send flight instructions to a first controller to direction movements of the unmanned aerial vehicle based on the flight instructions.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Unmanned aerial vehicles have become more and more popular over the last several years. Conventional unmanned aerial vehicles are typically very bulky. Personal unmanned aerial vehicles have become a focus of research and development in recent years to provide users with a tool of aerial photography and surveillance. Although these personal unmanned aerial vehicles are smaller than the conventional unmanned aerial vehicles, they are typically mounted on a vehicle or have to be transported using a backpack or other containers. Thus, transportation and control of conventional personal unmanned aerial vehicles are inconvenient.

Accordingly, the present disclosure provides, inter alia, an unmanned aerial vehicle, a wearable apparatus including an unmanned aerial vehicle, a wristwatch including a wearable apparatus, a method of operating an unmanned aerial vehicle, and an apparatus for operating an unmanned aerial vehicle that substantially obviate one or more of the problems due to limitations and disadvantages of the related art. In one aspect, the present disclosure provides an unmanned aerial vehicle. In some embodiments, the unmanned aerial vehicle includes a support having a plurality of receiving slots; a plurality of arms attached to the support; and a plurality of propellers respectively attached to the plurality of arms. Optionally, each of the plurality of receiving slots is configured to receive one of the plurality of arms and one of the plurality of propellers attached to the one of the plurality of arms.

As used herein, the term "unmanned aerial vehicle," or UAV, refers to any autonomous or semi-autonomous vehicle that is capable of performing some functions without a physically-present human pilot. Examples of flight-related functions may include, but are not limited to, autonomous flight, sensing its environment or operating in the air without a need for input from an operator, among others.

Figure 1:
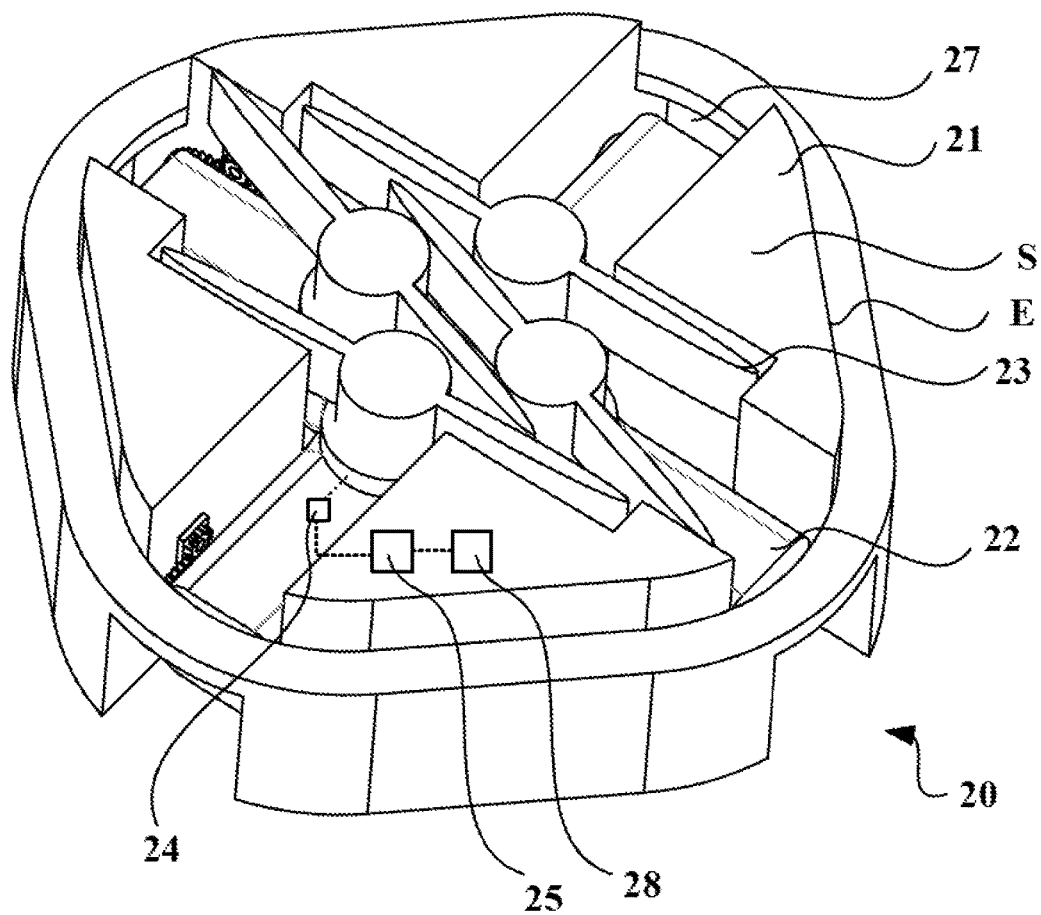
FIG. 1 is a schematic diagram illustration the structure of an unmanned aerial vehicle in some embodiments according to the present disclosure.

FIG. 1 is a schematic diagram illustration the structure of an unmanned aerial vehicle in some embodiments according to the present disclosure. Referring to FIG. 1, the unmanned aerial vehicle 20 in some embodiments includes a support 21 having a plurality of receiving slots 27, a plurality of arms 22 attached to the support 21, a plurality of propellers 23 respectively attached to the plurality of arms 22. Each of the plurality of receiving slots 27 is configured to receive one of the plurality of arms 22 and one of the plurality of propellers 23 attached to the one of the plurality of arms 22. Optionally, the unmanned aerial vehicle 20 is operated in a first mode in which the plurality of arms 22 and the plurality of propellers 23 are received in the plurality of receiving slots 27. FIG. 1 shows the unmanned aerial vehicle 20 in the first mode.

Figure 2:
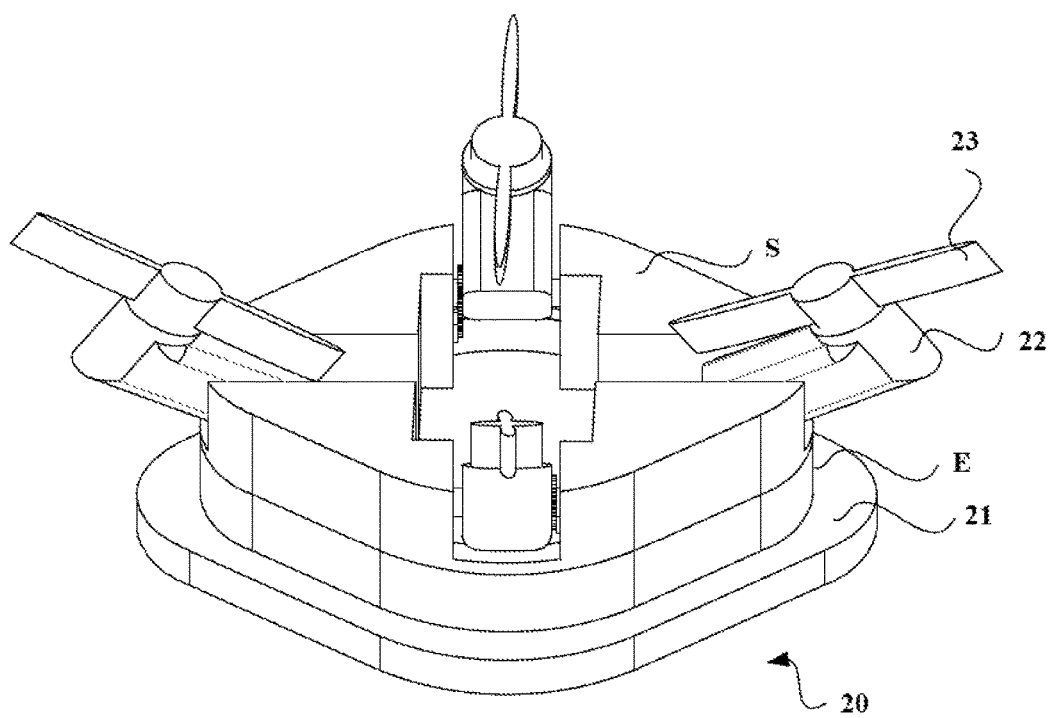
FIG. 2 is a schematic diagram illustration the structure of an unmanned aerial vehicle in some embodiments according to the present disclosure.

In some embodiments, the unmanned aerial vehicle 20 is operated in a second mode in which at least one of the plurality of arms 22 and at least one of the plurality of propellers 23 are extended out of at least one of the plurality of receiving slots 27. FIG. 2 is a schematic diagram illustration the structure of an unmanned aerial vehicle in some embodiments according to the present disclosure. Referring to FIG. 2, the unmanned aerial vehicle 20 is in a second mode in which all of the plurality of arms 22 and the plurality of propellers 23 are extended out of the plurality of receiving slots 27.

By having this design, the unmanned aerial vehicle 20 can be made extremely portable and user friendly. In the first mode (e.g., a rest mode), the unmanned aerial vehicle 20 can be packed into a compact structure in which the plurality of arms 22 and the plurality of propellers 23 are received in the plurality of receiving slots 27. As discussed in further details in the following sections, such a compact structure can conveniently fit into a wearable apparatus such as a wristwatch. When the unmanned aerial vehicle 20 is not in use, it can be securely disposed in the wearable apparatus, thereby saving space. In the second mode (e.g., a flying mode), the unmanned aerial vehicle 20 can be detached from the wearable apparatus, and the plurality of arms 22 and the plurality of propellers 23 are extended out of the plurality of receiving slots 27. Thus, the present unmanned aerial vehicle 20 can be miniaturized and an aesthetic outer appearance can be rendered.

In some embodiments, the unmanned aerial vehicle 20 has small dimensions. Optionally, the unmanned aerial vehicle 20 can be fit into a wearable apparatus. Optionally, the unmanned aerial vehicle 20 can be carried by a human. Optionally, the unmanned aerial vehicle 20 has a greatest dimension (e.g., length, width, height) of no more than 100 centimeters. Optionally, the greatest dimension of the unmanned aerial vehicle 20 is less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the unmanned aerial vehicle 20 is greater than or equal to any of the values described herein. Optionally, the unmanned aerial vehicle 20 has a greatest dimension falling within a range between any two of the values described herein.

The unmanned aerial vehicle 20 may have any appropriate numbers of arms and propellers. Optionally, a total number of the plurality of anus 22 and a total number of the plurality of propellers 23 in the unmanned aerial vehicle 20 are the same, e.g., each of the plurality of arms 22 corresponds to and is attached to one of the plurality of propellers 23. Optionally, the unmanned aerial vehicle 20 includes a total number of the plurality of anus 22 in a range of 3 to 6, and a total number of the plurality of propellers 23 in a range of 3 to 6. Optionally, the plurality of arms 22 are symmetrically distributed on the support 21. Optionally, the plurality of arms 22 are evenly and symmetrically distributed on the support 21. Referring to FIG. 1 and FIG. 2, the unmanned aerial vehicle 20 includes a total four arms and a total of four propellers.

Each of the plurality of arms 22 is attached to the support 21. Each of the plurality of arms 22 may be attached to the support 21 in any appropriate manner. Optionally, each of the plurality of arms 22 is articulated to the support 21, e.g., by a hinge. Each of the plurality of arms 22 is configured to move relative to the support 21. e.g., from a first position corresponding to the first mode (received in one of the plurality of receiving slots 27) to a second position corresponding to the second mode (extended out of one of the plurality of receiving slots 27). Between the first position and the second position, each of the plurality of arms 22 partially extends out of one of the plurality of receiving slots 27. Optionally, each of the plurality of arms 22 is configured to rotate with respect to a hinge connecting each of the plurality of arms 22 and the support 21, thereby moving relative to the support 21.

In some embodiments, each of the plurality of arms 22 is configured to transition between a folded configuration and an unfolded configuration. In the folded configuration, each of the plurality of arms 22 is at a first position corresponding to the first mode (received in one of the plurality of receiving slots 27). At the first position, each of the plurality of arms 22 is folded into one of the plurality of receiving slots 27. In the unfolded configuration, each of the plurality of arms 22 is at a second position corresponding to the second mode (extended out of one of the plurality of receiving slots 27). At the second position, each of the plurality of arms 22 fully extends out of one of the plurality of receiving slots 27. Between the first position and the second position, each of the plurality of arms 22 partially extends out of one of the plurality of receiving slots 27.

Referring to FIG. 1, the support 21 in some embodiments has a first surface S in a portion outside the region corresponding to the plurality of receiving slots 27. Optionally, in the first mode, the plurality of anus 22 and the plurality of propellers 23 are received in the plurality of receiving slots 27 so that top surfaces of the plurality of anus 22 and the plurality of propellers 23 are substantially level with, or lower than, the first surface S. Optionally, in the first mode, that top surfaces of the plurality of arms 22 and the plurality of propellers 23 only marginally protrude out of the first surface S1 so that the unmanned aerial vehicle 20 can be enclosed by a cap placed on top of the first surface S. Optionally, the support 21 (or a top portion thereof) has a first edge E forming a periphery of the support 21 (or the top portion thereof). Optionally, in the first mode, the plurality of arms 22 and the plurality of propellers 23 are received in the plurality of receiving slots 27 so that they are substantially within a region enclosed by the periphery of the support 21 (or the top portion thereof). Optionally, in the first mode, the plurality of arms 22 and the plurality of propellers 23 only marginally protrude out of the region enclosed by the periphery of the support 21 (or the top portion thereof), so that the unmanned aerial vehicle 20 can be enclosed by a cap placed on top of the first surface S and surrounding the periphery of the support 21 (or the top portion thereof).

Referring to FIG. 2, in the second mode, the plurality of arms 22 and the plurality of propellers 23 extend out of at least one of the first surface S and the periphery of the support 21 (or the top portion thereof) formed by the first edge E. Optionally, the plurality of arms 22 and the plurality of propellers 23 extend out of the periphery of the support 21 (or the top portion thereof), however, the top surfaces of the plurality of arms 22 and the plurality of propellers 23 are substantially level with, or lower than, the first surface S. Optionally, the plurality of arms 22 and the plurality of propellers 23 extend out of the periphery of the support 21 and the first surface S.

Figure 3:
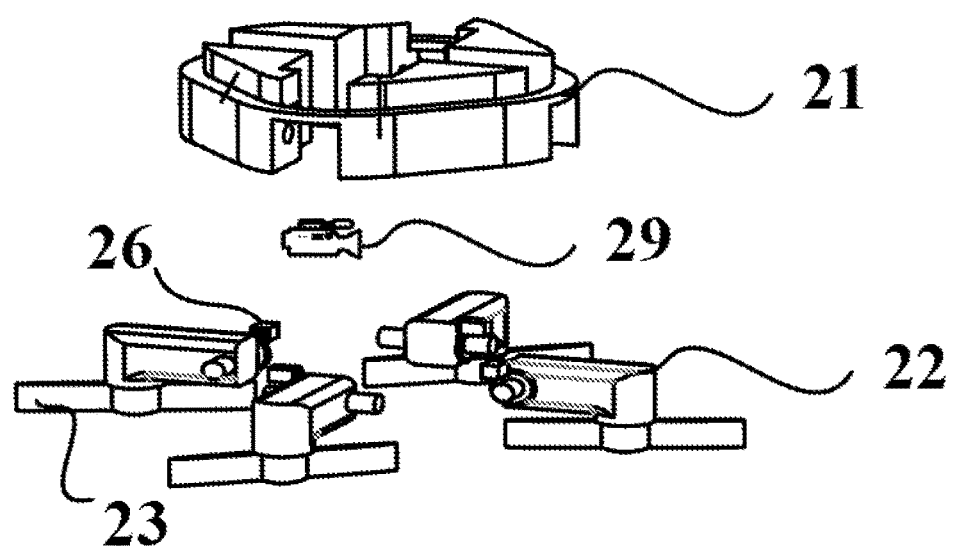
FIG. 3 is an exploded view of the unmanned aerial vehicle in FIG. 1.
Figure 7:
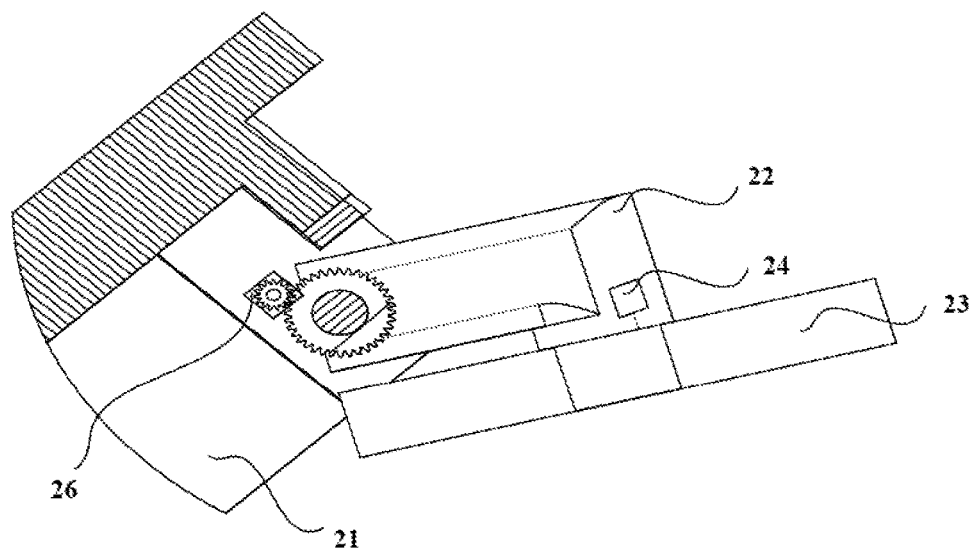
FIG. 7 is a zoom-in view of the unmanned aerial vehicle in FIG. 1.

FIG. 3 is an exploded view of the unmanned aerial vehicle in FIG. 1. FIG. 7 is a zoom-in view of the unmanned aerial vehicle in FIG. 1. Referring to FIG. 3 and FIG. 7, the unmanned aerial vehicle 20 in some embodiments further includes plurality of second driving motors 26 configured to respectively drive the plurality of arms 22. Optionally, each of the plurality of second driving motors 26 is coupled to a power source, e.g., a battery such as a lithium polymer battery. Optionally, each of the plurality of second driving motors 26 includes a shaft coupled to one of the plurality of arms 22 for driving the one of the plurality of arms 22. Each of the plurality of second driving motors 26 is configured to move one of the plurality of arms 22 relative to the support 21 from a first position corresponding to the first mode (received in one of the plurality of receiving slots 27) to a second position corresponding to the second mode (extended out of one of the plurality of receiving slots 27).

The plurality of receiving slots 27 may have any appropriate shapes and dimensions. Depending on a dimension of each of the plurality of anus 22 and each of the plurality of propellers 23, each of the plurality of receiving slots 27 may have a corresponding width, length, and depth sufficient for receiving each of the plurality of arms 22 and each of the plurality of propellers 23. Optionally, at least one of the plurality of receiving slots 27 is a receiving groove. Optionally, the plurality of receiving slots 27 are a plurality of receiving grooves. Optionally, at least one of the plurality of receiving slots 27 is a through-hole. Optionally, the plurality of receiving slots 27 are a plurality of through-holes.

Referring to FIG. 1, the unmanned aerial vehicle 20 in some embodiments further includes a plurality of first driving motors 24 configured to respectively drive the plurality of propellers 23. Optionally, each of the plurality of first driving motors 24 is coupled to a power source, e.g., a battery such as a lithium polymer battery. Optionally, each of the plurality of first driving motors 24 includes a shaft coupled to one of the plurality of propellers 23 for driving the one of the plurality of propellers 23.

In some embodiments, each of the plurality of arms 22 is a retractable arm configured to move between a retracted configuration and an extended configuration. Optionally, the retractable arm is a telescopic arm. By having this design, a larger speed range can be achieved in the unmanned aerial vehicle 20.

Referring to FIG. 3, the unmanned aerial vehicle 20 in some embodiments further includes a camera 29 (e.g., a video camera) configured to capture an image (e.g., a video stream, and a photo). Optionally, the camera 29 is attached to the support 21. Optionally, the camera 29 is attached to one of the plurality of arms 22.

Referring to FIG. 1, the unmanned aerial vehicle 20 in some embodiments further includes a first controller 25 operatively coupled to at least one of the plurality of propellers 23 and configured to be programmed with flight instructions to direct movements of the unmanned aerial vehicle 20 based on the flight instructions. Optionally, the first controller 25 is coupled to one of the plurality of propellers 23 through a first driving motor 24, thereby driving the one of the plurality of propellers 23.

In some embodiments, the first controller 25 includes a circuit board. Optionally, the circuit board includes a radio frequency receiver or a transceiver. Optionally, the first controller 25 further includes a motor driver configured to control the first driving motor 24. Optionally, the circuit board further includes a microcontroller configured to receive and store instructions for directing movements of the unmanned aerial vehicle 20. Optionally, the microcontroller is configured to compare a desired flight trajectory (e.g., flight path, flight direction, flight height, motion, etc.) with an actual flight trajectory and is configured to generate a control signal to control one of the plurality of first driving motors 24 to modify the flight trajectory so that it conform to the desired flight trajectory.

In some embodiments, the unmanned aerial vehicle 20 further includes a first sensor 28 configured to detect a flight trajectory of the unmanned aerial vehicle 20. As shown in FIG. 1, the first sensor 28 is in communication with the first controller 25. Optionally, the first controller 25 is configured to receive flight trajectory information of the unmanned aerial vehicle 20 from the first sensor 28, and modify the flight trajectory of the unmanned aerial vehicle 20 based on the flight instructions and the flight trajectory information of the unmanned aerial vehicle 20 received from the first sensor 28.

Examples of sensors include, but are not limited to, various motion sensors, rotation sensors, and other inertial sensors to continuously calculate the position, orientation, and velocity (direction and speed of movement) of the unmanned aerial vehicle 20. Specific examples of sensors include gyroscopes, accelerometers, and pressure sensors, as well as external references such as compasses and GPS (global positioning system) sensors, and the like.

Optionally, the first sensor 28 can be integrated with the first controller 25. In one example, the first sensor 28 is integrated into the first controller 25 as a component of the first controller 25.

Optionally, the first controller 25 is coupled to a single one of the plurality of propellers 23 (e.g., through the first driving motor 24). Optionally, the first controller 25 is coupled to two or more of the plurality of propellers 23 and configured to control the two or more of the plurality of propellers 23.

In another aspect, the present disclosure provides a wearable apparatus includes an unmanned aerial vehicle 20 described herein. In some embodiments, the wearable apparatus further includes a main body having a base portion. The unmanned aerial vehicle 20 is detachably attached to the base portion.

Figure 4:
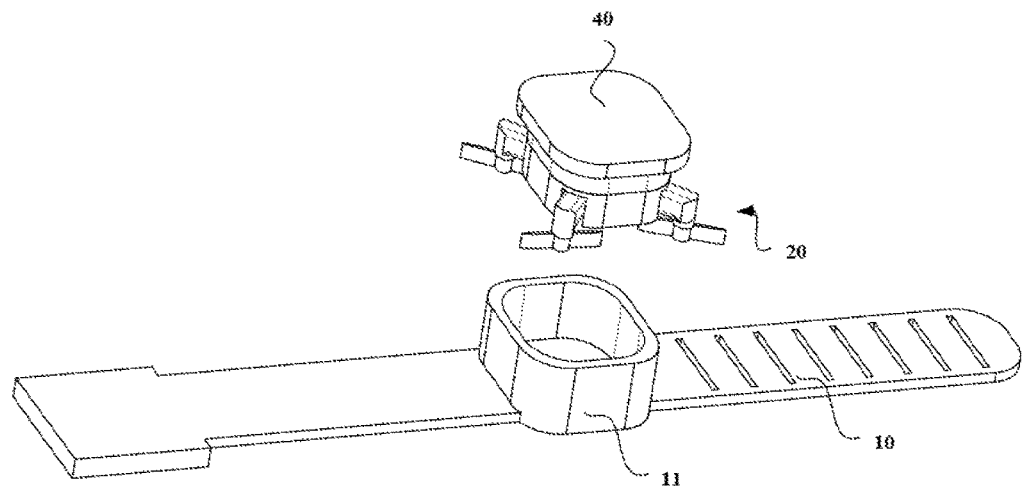
FIG. 4 is a schematic diagram illustrating the structure of a wearable apparatus in some embodiments according to the present disclosure.

FIG. 4 is a schematic diagram illustrating the structure of a wearable apparatus in some embodiments according to the present disclosure. Referring to FIG. 4, the wearable apparatus in some embodiments includes an unmanned aerial vehicle 20, and a main body 10 having a base portion 11. The unmanned aerial vehicle 20 is detachably attached to the base portion 11.

Examples of wearable apparatuses include, but are not limited to, a smart watch (e.g., a wristwatch), an electronic ring, an electronic necklace, an electronic bracelet, an electronic badge, an electronic fitness monitoring device, a smart wristband, an electronic hat, smart glasses, a wearable apparatus that is worn on clothing, a wearable apparatus that when worn contacts human skin.

As used herein, the term "detachably attached" refers to that the unmanned aerial vehicle 20 may be removed from the main body 10 (e.g., the base portion 11) in a nondestructive manner, e.g., may be removed only with reversible deformation of the unmanned aerial vehicle 20 and the main body 10. Optionally, the unmanned aerial vehicle 20 is detachably attached to the base portion 11 by a magnet. Optionally, the unmanned aerial vehicle 20 is detachably attached to the base portion 11 by a permanent magnet. Optionally, the unmanned aerial vehicle 20 is detachably attached to the base portion 11 electromagnetically. Optionally, the unmanned aerial vehicle 20 is detachably attached to the base portion 11 by a Velcro fastener.

Figure 5:
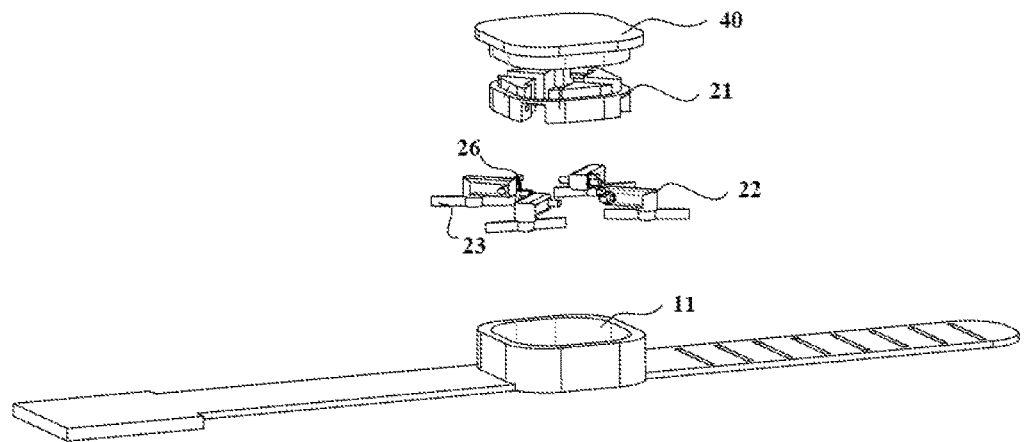
FIG. 5 is an exploded view of the wearable apparatus in FIG. 4.
Figure 6:
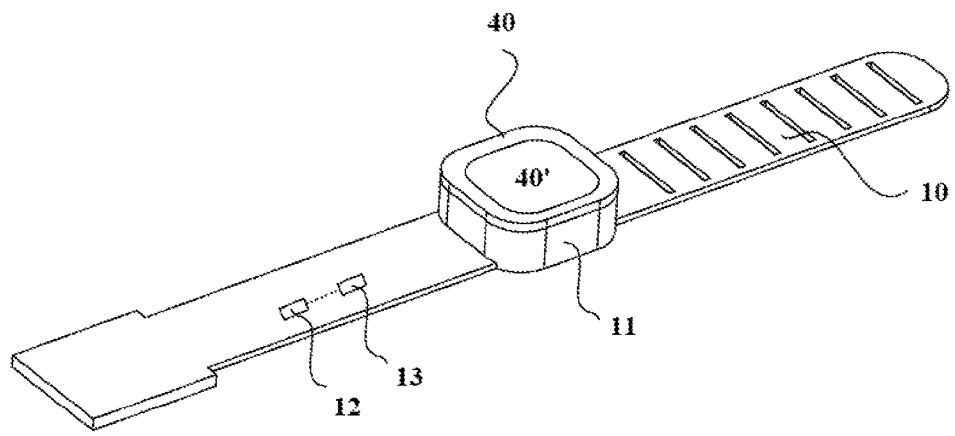
FIG. 6 is an exterior view of the wearable apparatus in FIG. 4.

In some embodiments, the wearable apparatus further includes a cap portion configured to be engaged with the base portion 11. FIG. 5 is an exploded view of the wearable apparatus in FIG. 4. FIG. 6 is an exterior view of the wearable apparatus in FIG. 4. Referring to FIGS. 4 to 6, the cap portion 40 and the base portion 11 are cooperatively engaged with each other. In the first mode, the plurality of arms 22 and the plurality of propellers 23 are received in the plurality of receiving slots 27. As shown in FIG. 6, in the first mode, the cap portion 40 and the base portion 11 are cooperatively engaged with each other so that the unmanned aerial vehicle 20 (not explicitly shown in FIG. 6) is enclosed by a space formed by the cap portion 40 and the base portion 11. In the second mode, the plurality of arms 22 and the plurality of propellers 23 extend out of the plurality of receiving slots 27. As shown in FIG. 4, in the second mode, the unmanned aerial vehicle 20 is not enclosed. Optionally, the first mode is a rest mode. Optionally, the second mode is a flight mode.

The cap portion 40 may be attached to the unmanned aerial vehicle 20 in any appropriate manner. Optionally, the cap portion 40 is detachably attached to the unmanned aerial vehicle 20. Optionally, the cap portion 40 is fixedly attached to the unmanned aerial vehicle 20. Referring to FIG. 6, the cap portion 40 in some embodiments includes a display screen 40'. Optionally, the display screen 40' is a display screen for displaying time. Optionally, the display screen 40' is a display screen for displaying image captured by a camera attached to the unmanned aerial vehicle or the cap portion 40. Optionally, the cap portion 40 further includes a power source coupled to the display screen. Optionally, the cap portion 40 is fixedly attached to the unmanned aerial vehicle 20, and the display screen in the cap portion 40 is coupled to a power source in the unmanned aerial vehicle 20.

In the present wearable apparatus, the unmanned aerial vehicle 20 is received in the base portion 11 of the wearable apparatus when the unmanned aerial vehicle 20 is in a rest mode. In a flight mode, the unmanned aerial vehicle 20 is detached from the base portion 11. When the unmanned aerial vehicle 20 is not in use, it can be securely disposed in the wearable apparatus, thereby saving space. By having this design, the unmanned aerial vehicle 20 can be made extremely portable and easy to be stored. Thus, the wearable apparatus having the unmanned aerial vehicle 20 can be miniaturized and an aesthetic outer appearance can be rendered.

Referring to FIG. 1, the unmanned aerial vehicle 20 of the wearable apparatus in some embodiments further includes a first controller 25 operatively coupled to at least one of the plurality of propellers 23 and configured to be programmed with flight instructions to direct movements of the unmanned aerial vehicle 20 based on the flight instructions. Optionally, the first controller 25 is coupled to one of the plurality of propellers 23 through a first driving motor 24, thereby driving the one of the plurality of propellers 23.

Referring to FIG. 6, the main body 10 of the wearable apparatus in some embodiments further includes a second controller 13, and a second sensor 12 in communication with the second controller 13 and configured to detect a gesture of a user wearing the wearable apparatus. The second controller 13 is configured to receive user gesture information from the second sensor 12 and provide the flight instructions to the first controller in the unmanned aerial vehicle (see, e.g., the first controller 25 in FIG. 1) based on the user gesture information. The first controller is configured to receive the flight instructions from the second controller 13 to direct movements of the unmanned aerial vehicle based on the flight instructions.

In some embodiments, the user gesture information includes an initial status information of the user and a motion information of the user. Optionally, the initial status information includes an initial status information of a human body part wearing the wearable apparatus; and the motion information includes a motion information of the human body part wearing the wearable apparatus. In one example, the wearable apparatus is a wristwatch, and the initial status information includes an initial status information of a wrist of the user wearing the wearable apparatus, and the motion information includes a motion information of the wrist of the user wearing the wearable apparatus. As used herein, the term initial status information refers to a status information of the user (e.g., a status information of a human body part wearing the wearable apparatus) at any time point the second controller 13 is configured to determine flight instructions based on the user gesture. Optionally, the second controller 13 is configured to repeatedly determine the flight instructions at every time interval, and the initial status information refers to the status information at an initial time point of every time interval. Optionally, the second controller 13 is configured to determine the flight instructions based on the user gesture in real time. Optionally, the initial status information includes coordinates of the human body part wearing the wearable apparatus at the initial time point of every time interval. Optionally, the initial status information includes an initial trajectory of the human body part wearing the wearable apparatus at the initial time point of every time interval.

In some embodiments, the second controller 13 is configured to determine a projected direction of motion of the human body part wearing the wearable apparatus having the unmanned aerial vehicle 20. Optionally, the second controller 13 is configured to determine the projected direction of motion of the human body part wearing the wearable apparatus having the unmanned aerial vehicle 20 based on the initial status information of a human body part wearing the wearable apparatus and the motion information of the human body part wearing the wearable apparatus. Optionally, the second controller 13 is configured to determine the flight instructions based on the projected direction of motion of the human body part wearing the wearable apparatus having the unmanned aerial vehicle 20, and provide the flight instructions to the first controller. As used herein, the term "projected direction" refers to a direction that is projected to be the direction followed by the human body part wearing the wearable apparatus having the unmanned aerial vehicle 20.

In some embodiments, the second controller 13 is configured to determine a displacement of the human body part wearing the wearable apparatus having the unmanned aerial vehicle 20 along a direction of motion of the human body part, and determine the projected direction of motion based on the displacement and a threshold displacement value. Optionally, the direction of motion of the human body part is determined as the projected direction of motion when the second controller 13 determines that the displacement of the human body part is equal to or greater than the threshold displacement value.

Threshold displacement value may be any appropriate value. In one example, the threshold displacement value may be on the orders of millimeters, tens of millimeters, centimeters, tens of centimeters, meters, or tens of meters. In another example, the threshold displacement value may be in a range of approximately 1 millimeter to approximately 1 centimeter, approximately 1 centimeter to approximately 5 centimeters, approximately 5 centimeters to approximately 10 centimeters, approximately 10 centimeters to approximately 15 centimeters, approximately 15 centimeters to approximately 20 centimeters, approximately 20 centimeters to approximately 25 centimeters, approximately 25 centimeters to approximately 30 centimeters, and so on. Optionally, the threshold displacement value may be equal to or greater than 1 millimeter, equal to or greater than 1 centimeter, equal to or greater than 5 centimeters, equal to or greater than 10 centimeters, equal to or greater than 15 centimeters, equal to or greater than 20 centimeters, equal to or greater than 25 centimeters, or equal to or greater than 30 centimeters. Optionally, the threshold displacement value may be equal to or less than 10 meter, equal to or less than 1 meter, equal to or less than 50 centimeters, equal to or less than 30 centimeters, equal to or less than 25 centimeters, equal to or less than 20 centimeters, equal to or less than 15 centimeters, or equal to or less than 10 centimeters. Optionally, the threshold displacement value is approximately 1 millimeter, approximately 1 centimeter, approximately 5 centimeters, approximately 10 centimeters, approximately 15 centimeters, approximately 20 centimeters, approximately 25 centimeters, approximately 30 centimeters, and so on. Optionally, the threshold displacement value may be a pre-determined threshold value. For example, the threshold displacement may be a pre-determined value such that the second controller 13 may sensitively detect the displacement of the human body part while any slight movements of the human body part unintended for controlling the unmanned aerial vehicle are ignored.

In some embodiments, a user wears the wearable apparatus having the unmanned aerial vehicle 20. In one example, the user may detach the unmanned aerial vehicle 20 from the base portion 11 of the wearable apparatus, and direct the movements (e.g., trajectory) of the unmanned aerial vehicle 20 using the movements of the human body part wearing the wearable apparatus (e.g., the wrist of the user). Smart and convenient control of the unmanned aerial vehicle 20 can be achieved using the present wearable apparatus.

Once the projected direction of motion of the human body part wearing the wearable apparatus having the unmanned aerial vehicle 20 is determined, the motion of the human body part wearing the wearable apparatus may be determined. Various motion information may be used to determine flight instructions for direction movements of the unmanned aerial vehicle 20. In one example, an upward motion of the human body part wearing the wearable apparatus having the unmanned aerial vehicle 20 corresponds to a flight instruction to increase flight height of the unmanned aerial vehicle 20. In another example, a downward motion of the human body part wearing the wearable apparatus having the unmanned aerial vehicle 20 corresponds to a flight instruction to decrease flight height of the unmanned aerial vehicle 20. In another example, a forward motion of the human body part wearing the wearable apparatus having the unmanned aerial vehicle 20 corresponds to a flight instruction to move forward the unmanned aerial vehicle 20. In another example, a backward motion of the human body part wearing the wearable apparatus having the unmanned aerial vehicle 20 corresponds to a flight instruction to move backward the unmanned aerial vehicle 20. In another example, a plurality of consecutive shaking motions of the human body part wearing the wearable apparatus having the unmanned aerial vehicle 20 corresponds to a flight instruction to hover the unmanned aerial vehicle 20 in the air. In another example, a horizontal counter-clock-wise circular motion of the human body part wearing the wearable apparatus having the unmanned aerial vehicle 20 corresponds to a flight instruction to accelerate the unmanned aerial vehicle 20. In another example, a horizontal clock-wise circular motion of the human body part wearing the wearable apparatus having the unmanned aerial vehicle 20 corresponds to a flight instruction to decelerate the unmanned aerial vehicle 20. In another example, a vertical clock-wise circular motion of the human body part wearing the wearable apparatus having the unmanned aerial vehicle 20 corresponds to a flight instruction to flip over the unmanned aerial vehicle 20 on the left side. In another example, a vertical counter-clock-wise circular motion of the human body part wearing the wearable apparatus having the unmanned aerial vehicle 20 corresponds to a flight instruction to flip over the unmanned aerial vehicle 20 on the right side. Various alternatives to the embodiments described herein may be employed in determining flight instructions based on the motion information.

Referring to FIG. 1, the unmanned aerial vehicle 20 in some embodiments further includes a first sensor 28 in communication with the first controller 25 and configured to detect a flight trajectory of the unmanned aerial vehicle 20. The first controller 25 is configured to receive flight trajectory information of the unmanned aerial vehicle 20 from the first sensor 28, and modify the flight trajectory of the unmanned aerial vehicle 20 based on the flight instructions and the flight trajectory information of the unmanned aerial vehicle 20 received from the first sensor 28. Optionally, the first sensor 28 can be integrated with the first controller 25. In one example, the first sensor 28 is integrated into the first controller 25 as a component of the first controller 25. Optionally, the first controller 25 is coupled to a single one of the plurality of propellers 23 (e.g., through the first driving motor 24). Optionally, the first controller 25 is coupled to two or more of the plurality of propellers 23 and configured to control the two or more of the plurality of propellers 23.

By having a first sensor 28 to monitor the flight trajectory of the unmanned aerial vehicle 20, e.g., in real time, the flight trajectory of the unmanned aerial vehicle 20 can be modified by the first controller 25, e.g., in real time, if the flight trajectory of the unmanned aerial vehicle 20 deviates from an intended flight trajectory. e.g., the flight trajectory intended by the flight instructions sent from the second controller and received by the first controller. By having this design, accuracy and reliability of the flight path of the unmanned aerial vehicle 20 can be significantly enhanced.

In some embodiments, the first sensor 28 and the second sensor 12 are sensors configured to detect at least six parameters, including speeds and accelerations along x, y, and z directions. Optionally, each of the first sensor 28 and the second sensor 12 is a sensor assembly having a three-axis digital gyroscope and an accelerometer.

Referring to FIG. 1 and FIG. 3, the first controller 25, based on the flight instructions received from the second controller 13, is configured to control one of the plurality of first driving motors 24 to drive one of the plurality of propellers 23. Optionally, the first controller 25, based on the flight instructions received from the second controller 13, is configured to control one of the plurality of second driving motors 26 to drive one of the plurality of arms 22. Optionally, each of the plurality of second driving motors 26 is configured to drive the one of the plurality of arms 22 to be received in the support 21 or extend out of the support 21.

Optionally, the unmanned aerial vehicle 20 includes a plurality of first driving motors 24 configured to respectively drive the plurality of propellers 23 and a plurality of second driving motors 26 configured to respectively drive the plurality of arms 22. The first controller 25 is configured to control the plurality of first driving motors 24 and the plurality of second driving motors 26 thereby controlling movements of the plurality of propellers 23 and the plurality of arms 22. By controlling movements of the plurality of propellers 23, flight trajectory of the unmanned aerial vehicle 20 can be controlled based on the flight instructions.

Optionally, each of the plurality of first driving motors 24 includes a shaft coupled to one of the plurality of propellers 23 for driving the one of the plurality of propellers 23.

Optionally, each of the plurality of second driving motors 26 includes a shaft coupled to one of the plurality of arms 22 for driving the one of the plurality of arms 22. Each of the plurality of second driving motors 26 is configured to move one of the plurality of arms 22 relative to the support 21 from a first position corresponding to the first mode (received in one of the plurality of receiving slots 27) to a second position corresponding to the second mode (extended out of one of the plurality of receiving slots 27).

In some embodiments, the unmanned aerial vehicle 20 further includes a sensor to detect one or more obstacles that the unmanned aerial vehicle 20 may encounter during its flight. Optionally, the sensor is configured to detect a distance between the obstacle and the unmanned aerial vehicle 20, e.g., in real time. Optionally, the sensor is an ultrasonic sensor. Optionally, the first controller 25 is configured to receive information regarding the distance between the obstacle and the unmanned aerial vehicle 20. e.g., real time distance information, and control the unmanned aerial vehicle 20 to avoid the obstacle during its flight. By having an obstacle sensor, intelligent and convenient control of the unmanned aerial vehicle 20 can be achieved.

In some embodiments, the wearable apparatus is a wristwatch. Optionally, the wristwatch includes a watch belt attached to a main body, and a display screen, e.g., a display screen for displaying time. Optionally, the unmanned aerial vehicle 20 further includes a cap portion configured to be engaged with a base portion. Optionally, the display screen is on the cap portion. Optionally, the wristwatch further includes a camera attached to the unmanned aerial vehicle 20.

Figure 8:
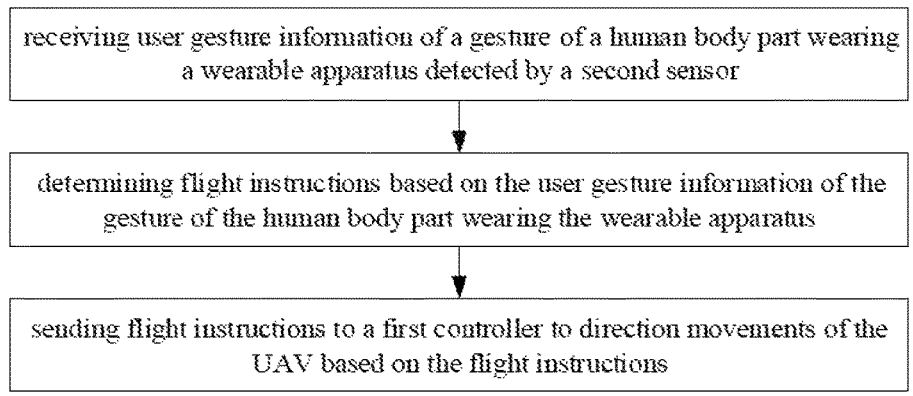
FIG. 8 is a flow chart illustrating a method of operating an unmanned aerial vehicle in some embodiments according to the present disclosure.

In another aspect, the present disclosure provides a method of operating an unmanned aerial vehicle. In some embodiments, the method includes detecting a gesture of a user wearing a wearable apparatus including the unmanned aerial vehicle; and determining flight instructions for directing movements of the unmanned aerial vehicle based on user gesture information. FIG. 8 is a flow chart illustrating a method of operating an unmanned aerial vehicle in some embodiments according to the present disclosure. Referring to FIG. 8, the method in some embodiments includes receiving user gesture information of a gesture of a human body part wearing a wearable apparatus detected by a second sensor; determining flight instructions based on the user gesture information of the gesture of the human body part wearing the wearable apparatus; and sending flight instructions to a first controller to direction movements of the unmanned aerial vehicle based on the flight instructions. Optionally, the unmanned aerial vehicle is part of the wearable apparatus worn by the user. The wearable apparatus includes a base portion and the unmanned aerial vehicle, the unmanned aerial vehicle detachably attached to the base portion. In a flight mode, the unmanned aerial vehicle is detached from the base portion. Optionally, the base portion includes a second sensor configured to detect the user gesture information of the gesture of the human body part wearing the wearable apparatus. Optionally, the unmanned aerial vehicle includes a first controller configured to receive the flight instructions.

In some embodiments, the user gesture information includes an initial status information of the user and a motion information of the user. Optionally, the initial status information includes an initial status information of a human body part wearing the wearable apparatus; and the motion information includes a motion information of the human body part wearing the wearable apparatus. In one example, the wearable apparatus is a wristwatch, and the initial status information includes an initial status information of a wrist of the user wearing the wearable apparatus, and the motion information includes a motion information of the wrist of the user wearing the wearable apparatus.

In some embodiments, the step of determining flight instructions based on the user gesture information of the gesture of the human body part wearing the wearable apparatus includes a step of determining a projected direction of motion of the human body part wearing the wearable apparatus having the unmanned aerial vehicle. Optionally, the projected direction of motion of the human body part wearing the wearable apparatus having the unmanned aerial vehicle is determined based on the initial status information of a human body part wearing the wearable apparatus and the motion information of the human body part wearing the wearable apparatus.

Figure 9:
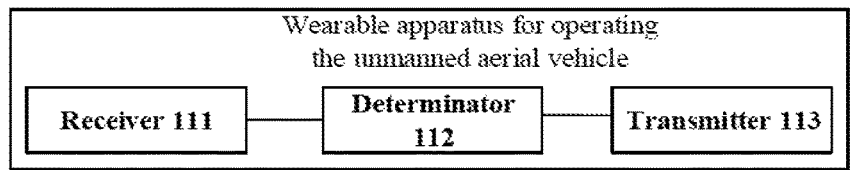
FIG. 9 is a schematic diagram illustrating the structure of a wearable apparatus for operating an unmanned aerial vehicle in some embodiments according to the present disclosure.

In some embodiments, the step of determining the projected direction of motion of the human body part wearing the wearable apparatus having the unmanned aerial vehicle includes determining a displacement of the human body part wearing the wearable apparatus having the unmanned aerial vehicle along a direction of motion of the human body part, and determining the projected direction of motion based on the displacement and a threshold displacement value. Optionally, the direction of motion of the human body part is determined as the projected direction of motion when the displacement of the human body part is equal to or greater than the threshold displacement value. Smart and convenient control of the unmanned aerial vehicle can be achieved using the present method In another aspect, the present disclosure provides an apparatus for operating an unmanned aerial vehicle. FIG. 9 is a schematic diagram illustrating the structure of a wearable apparatus for operating an unmanned aerial vehicle in some embodiments according to the present disclosure. Referring to FIG. 9, the wearable apparatus for operating the unmanned aerial vehicle in some embodiments includes a receiver 111, a determinator 112 and a transmitter 113. The receiver 111 is configured to receive from a second controller user gesture information of a gesture of a human body part wearing a wearable apparatus. The determinator 112 is configured to determine flight instructions based on the user gesture information of the gesture of the human body part wearing the wearable apparatus. The transmitter 113 is configured to send flight instructions to a first controller to direction movements of the unmanned aerial vehicle based on the flight instructions.

In some embodiments, the user gesture information includes an initial status information of the user and a motion information of the user. Optionally, the initial status information includes an initial status information of a human body part wearing the wearable apparatus; and the motion information includes a motion information of the human body part wearing the wearable apparatus. In one example, the wearable apparatus is a wristwatch, and the initial status information includes an initial status information of a wrist of the user wearing the wearable apparatus, and the motion information includes a motion information of the wrist of the user wearing the wearable apparatus.

In some embodiments, the determinator 112 is configured to determine a projected direction of motion of the human body part wearing the wearable apparatus having the unmanned aerial vehicle, thereby determine the flight instructions. Optionally, the determinator 112 is configured to determine the projected direction of motion of the human body part wearing the wearable apparatus having the unmanned aerial vehicle based on the initial status information of a human body part wearing the wearable apparatus and the motion information of the human body part wearing the wearable apparatus.

In some embodiments, the determinator 112 is configured to determine a displacement of the human body part wearing the wearable apparatus having the unmanned aerial vehicle along a direction of motion of the human body part; and determine the projected direction of motion of the human body part wearing the wearable apparatus having the unmanned aerial vehicle based on the displacement and a threshold displacement value. Optionally, the direction of motion of the human body part is determined as the projected direction of motion when the displacement of the human body part is equal to or greater than the threshold displacement value. Smart and convenient control of the unmanned aerial vehicle can be achieved using the present apparatus.

Figure 10:
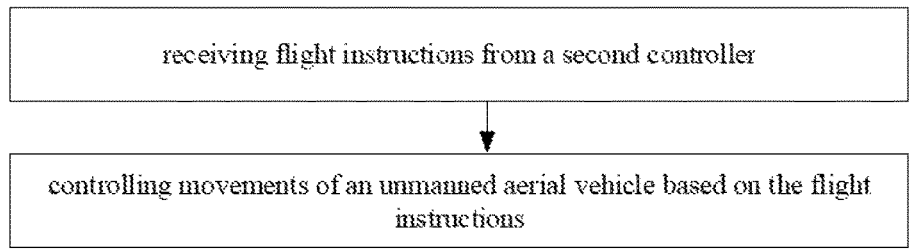
FIG. 10 is a flow chart illustrating a method of controlling an unmanned aerial vehicle in some embodiments according to the present disclosure.

In another aspect, the present disclosure provides a method of controlling an unmanned aerial vehicle. FIG. 10 is a flow chart illustrating a method of controlling an unmanned aerial vehicle in some embodiments according to the present disclosure. Referring to FIG. 10, the method in some embodiments includes receiving flight instructions from a second controller, and controlling movements of an unmanned aerial vehicle based on the flight instructions. Optionally, the method further includes receiving flight trajectory information of the unmanned aerial vehicle from a first sensor, and modifying a flight trajectory of the unmanned aerial vehicle based on the flight instructions and the flight trajectory information of the unmanned aerial vehicle received from the first sensor. Smart and convenient control of the unmanned aerial vehicle can be achieved using the present method.

Figure 11:
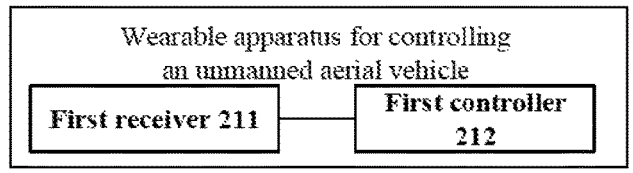
FIG. 11 is a schematic diagram illustrating the structure of a wearable apparatus for controlling an unmanned aerial vehicle in some embodiments according to the present disclosure.

In another aspect, the present disclosure provides an apparatus for controlling an unmanned aerial vehicle. FIG. 11 is a schematic diagram illustrating the structure of a wearable apparatus for controlling an unmanned aerial vehicle in some embodiments according to the present disclosure. Referring to FIG. 11, the wearable apparatus for controlling an unmanned aerial vehicle in some embodiments includes a first receiver 211 and a first controller 212. The first receiver 211 is configured to receive flight instructions from a second controller. The first controller 212 is configured to control movements of an unmanned aerial vehicle based on the flight instructions. Optionally, the apparatus further includes a second receiver configured to receive flight trajectory information of the unmanned aerial vehicle from a first sensor; and a second controller configured to modify a flight trajectory of the unmanned aerial vehicle based on the flight instructions and the flight trajectory information of the unmanned aerial vehicle received from the first sensor. Smart and convenient control of the unmanned aerial vehicle can be achieved using the present apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such tens should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An unmanned aerial vehicle (UAV), comprising:
a support having a plurality of receiving slots;
a plurality of arms attached to the support; and
a plurality of propellers respectively attached to the plurality of arms;
wherein each of the plurality of receiving slots is configured to receive one of the plurality of arms and one of the plurality of propellers attached to the one of the plurality of arms.

2. The UAV of claim 1, further comprising a plurality of first driving motors configured to respectively drive the plurality of propellers.

3. The UAV of claim 1, further comprising a plurality of second driving motors configured to respectively drive the plurality of arms;
wherein each of the plurality of arms is articulated to the support.

4. The UAV of claim 1, wherein the plurality of arms are a plurality of retractable arms.

5. The UAV of claim 1, wherein a total number of the plurality of arms is in a range of 3 to 6; and
the plurality of arms are symmetrically distributed on the support.

6. The UAV of claim 1, further comprising a first controller operatively coupled to at least one of the plurality of propellers and configured to be programmed with flight instructions to direct movements of the UAV based on the flight instructions.

7. The UAV of claim 1, further comprising a first sensor configured to detect a flight trajectory of the UAV.

8. A wearable apparatus, comprising:
the UAV of claim 1; and
a main body comprising a base portion;
wherein the UAV is detachably attached to the base portion.

9. The wearable apparatus of claim 8, wherein the UAV is magnetically attached to the base portion.

10. The wearable apparatus of claim 8, further comprising a cap portion configured to be cooperatively engaged with the base portion;
wherein the cap portion is attached to the UAV.

11. The wearable apparatus of claim 8, wherein the UAV further comprises a first controller operatively coupled to at least one of the plurality of propellers and configured to be programmed with flight instructions to direct movements of the UAV;
the main body further comprises a second controller, and a second sensor in communication with the second controller and configured to detect a gesture of a user wearing the wearable apparatus;
the second controller is configured to receive user gesture information from the second sensor and provide the flight instructions to the first controller based on the user gesture information; and the first controller is configured to receive the flight instructions from the second controller to direct movements of the UAV based on the flight instructions.

12. The wearable apparatus of claim 11, wherein the user gesture information comprises an initial status information of the user and a motion information of the user.

13. The wearable apparatus of claim 12, wherein the initial status information comprises an initial status information of a human body part wearing the wearable apparatus; and the motion information comprises a motion information of the human body part wearing the wearable apparatus.

14. The wearable apparatus of claim 13, wherein the motion information comprises information regarding a projected direction of motion of the human body part wearing the wearable apparatus having the unmanned aerial vehicle;

the second sensor is configured to determine a displacement of the human body part wearing the wearable apparatus having the unmanned aerial vehicle along a direction of motion of the human body part; and the second controller is configured to use the direction of motion of the human body part as the projected direction of motion, based on a determination that the displacement along the direction of motion of the human body part is equal to or greater than a threshold displacement value.

15. The wearable apparatus of claim 11, wherein the UAV further comprises a first sensor in communication with the first controller and configured to detect a flight trajectory of the UAV; and the first controller is configured to receive flight trajectory information of the UAV from the first sensor, and modify the flight trajectory of the UAV based on the flight instructions and the flight trajectory information of the UAV received from the first sensor.

16. The wearable apparatus of claim 11, wherein the UAV further comprises a plurality of first driving motors configured to respectively drive the plurality of propellers and a plurality of second driving motors configured to respectively drive the plurality of arms; and the first controller is configured to control the plurality of first driving motors and the plurality of second driving motors thereby controlling movements of the plurality of propellers and the plurality of arms.

17. A wristwatch comprising the wearable apparatus of claim 8;

a watch belt attached to the main body; and a display screen;

wherein the UAV further comprises a cap portion configured to be engaged with the base portion; and the display screen is on the cap portion.

18. The wristwatch of claim 17, further comprising a camera attached to the UAV.

19. A method of operating an unmanned aerial vehicle (UAV), comprising:

receiving user gesture information of a gesture of a human body part wearing a wearable apparatus detected by a second sensor;

determining flight instructions based on the user gesture information of the gesture of the human body part wearing the wearable apparatus; and sending flight instructions to a first controller to direction movements of the UAV based on the flight instructions.

20. An apparatus for operating an unmanned aerial vehicle (UAV), comprising:

a receiver configured to receive from a second controller user gesture information of a gesture of a human body part wearing a wearable apparatus;

a determinator configured to determine flight instructions based on the user gesture information of the gesture of the human body part wearing the wearable apparatus; and a transmitter configured to send flight instructions to a first controller to direction movements of the unmanned aerial vehicle based on the flight instructions.

* * * * *